(12) United States Patent
Pydin (10) Patent No.: US 12,394,114 B2
(45) Date of Patent: Aug. 19, 2025

(54) CONTROL SYSTEM OF WORKING MACHINE AND CONTROL METHOD OF WORKING MACHINE

(71) Applicant: HONDA MOTOR CO., LTD., Tokyo (JP)

(72) Inventor: Andrii Pydin, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 259 days.

(21) Appl. No.: 18/128,278

(22) Filed: Mar. 30, 2023

(65) Prior Publication Data

US 2024/0331216 A1    Oct. 3, 2024

(51) Int. Cl.
| | |
|---|---|
| *G06T 11/00* | (2006.01) |
| *G05D 1/00* | (2024.01) |
| *G05D 1/81* | (2024.01) |
| *G06N 3/08* | (2023.01) |
| *G06N 5/00* | (2023.01) |
| *G06T 5/00* | (2024.01) |
| *G06V 10/75* | (2022.01) |
| *G06V 20/10* | (2022.01) |

(52) U.S. Cl.
CPC .......... *G06T 11/001* (2013.01); *G05D 1/0038* (2013.01)

(58) Field of Classification Search
CPC ........ G05D 1/0038; G05D 1/648; G05D 1/81; G05D 1/248; G05D 1/249; G05D 1/2246; G05D 1/646; G05D 2109/10; G05D 2107/15; G05D 2107/21; G06T 11/001; G06T 5/00–5/08; G06T 7/11; G06T 2200/00; G06T 2207/00; G06T 2207/10024; A01B 69/008; G06N 3/08; G06N 5/00; G06V 10/75; G06V 20/10; B60K 35/00; B60K 35/10; B60K 35/81; B60K 35/215; B60K 35/234; B60K 35/23; B60K 35/28; G02B 27/01; G02B 2027/0141; G02B 2027/0138

See application file for complete search history.

(56) References Cited

FOREIGN PATENT DOCUMENTS

| | | | |
|---|---|---|---|
| JP | 2010-114575 | 5/2010 | |
| JP | 2022124656 A | * 8/2022 | ........... A01B 69/008 |
| JP | 2023066736 A | * 5/2023 | ............. G05D 1/646 |

* cited by examiner

*Primary Examiner* — Wesner Sajous
(74) *Attorney, Agent, or Firm* — Amin, Turocy & Watson, LLP (57) ABSTRACT

To provide a control system of a working machine and a control method of the working machine that enables an operator side to control the working machine, on the basis of an image transmitted from the working machine side.

In a control system of a working machine which operates the working machine by an image from the working machine side, the working machine includes an image processing unit which converts a color image into a grayscale image; and a working machine communication unit which transmits the grayscale image from the working machine side to the system side, and the system includes a system communication unit which receives the grayscale image transmitted by the working machine; and a processing unit which restores a color image from the grayscale image, by the use of a learning model created using an original image of a working area, and an image in which tonal information is reduced from the original image.

6 Claims, 9 Drawing Sheets

| LATITUDE | LONGITUDE | ATTITUDE (DIRECTION OF NORTH) | IMAGE |
|---|---|---|---|
| 35.788065 | 139.6062605 | 35° | IMAGE 1 |
| 35.788063 | 139.6062600 | 33° | IMAGE 2 |
| 35.788061 | 139.6062595 | 33° | IMAGE 3 |
| 35.788059 | 139.6062590 | 34° | IMAGE 4 |

FIG. 8

CONTROL SYSTEM OF WORKING MACHINE AND CONTROL METHOD OF WORKING MACHINE

BACKGROUND OF THE INVENTION

Field of the Invention

The present invention relates to a control system of a working machine and a control method of a working machine.

Description of Related Art

There is a case in which a delivery robot may be remotely controlled via a human intervention in a situation in which it is difficult to make determinations during automatic driving. One situation in which it is difficult to make determinations is, for example, passing through an intersection, or the like. An operator at a remote location performs remote control, while viewing an image from a camera mounted on the delivery robot. When there is a delay in transmission of an image, the operator cannot accurately determine the situation at the site. Therefore, it is necessary to transmit images with as little delay as possible. In order to transmit images with little delay, it is possible to reduce the data capacity of images as much as possible.

Regarding techniques for reducing the data capacity of communication, a technique for reducing the resolution of regions other than a region of interest is known (for example, see Patent Document 1). This technique selects one piece of image data from a plurality of pieces of image data as main image data, selects sub-image data from image data other than the image data selected as the main image data, reduces and converts the selected sub-image data into image data having a resolution smaller than that of the main image data, and creates display data in which the converted sub-image data is disposed superimposed inside the main image data.

[Patent Document 1] Japanese Unexamined Patent Application, First Publication No. 2010-114575

SUMMARY OF THE INVENTION

An object of the present invention is to provide a control system of a working machine and a control method of the working machine that can control the working machine on an operator side, on the basis of an image transmitted from the working machine side.

The control system of the working machine according to the present invention has the following configuration.

(1): A control system of a working machine according to an aspect of the present invention is a control system of a working machine which operates the working machine by an image from the working machine side, in which the working machine includes an image processing unit which converts a color image into a grayscale image, and a working machine communication unit which transmits the grayscale image from the working machine side to the system side, and the system includes a system communication unit which receives the grayscale image transmitted by the working machine, and a processing unit which restores a color image from the grayscale image, by the use of a learning model created using an original image of a working area and an image in which tonal information of the original image is reduced.

(2): In the above aspect (1), the image processing unit creates an image obtained by lowering the resolution of the grayscale image, the working machine communication unit transmits the image obtained by lowering the resolution of the grayscale image from the working machine side to the system side, the system communication unit receives the image obtained by lowering the resolution of the grayscale image transmitted by the working machine, and the processing unit restores a color image from the image obtained by lowering the resolution of the grayscale image, by the use of the learning model created using the original image of the working area and the image obtained by lowering the resolution of the image in which tonal information is reduced from the original image.

(3): In the above aspect (1), the working machine includes a relearning determination unit which determines whether to relearn the learning model on the basis of a plurality of object regions included in the color image acquired at a plurality of time points.

(4): In the above aspect (3), the relearning determination unit acquires a difference portion from a difference image between images obtained by dividing a plurality of objects included in the color image acquired at a plurality of time points into respective objects and determines whether to relearn the learning model on the basis of the number of pixels of the acquired difference portion.

(5): In the above aspect (4), the relearning determination unit determines to relearn the learning model, when the number of pixels of the difference portion is equal to or greater than a threshold value.

The control method of the working machine according to the present invention adopts the following configuration.

(6): A control method of a working machine which operates the working machine by an image from the working machine side, in which the working machine converts a color image into a grayscale image, the working machine transmits the grayscale image from the working machine side to the system side, the system receives the grayscale image transmitted by the working machine, and the system restores a color image from the grayscale image, by the use of a learning model created using an original image of a working area, and an image in which tonal information is reduced from the original image.

According to (1) to (6), it is possible to control the working machine on the operator side, on the basis of the image transmitted from the working machine side.

DETAILED DESCRIPTION OF THE INVENTION

Next, a control system of a working machine and a control method of the working machine according to the present embodiment will be described with reference to the drawings. The embodiment to be described below is merely an example, and embodiments to which the present invention is applied are not limited to the following embodiment. In addition, in all the drawings for explaining the embodiment, the same reference numerals are used for the parts having the same functions, and repeated explanations will not be provided.

In addition, "on the basis of XX" in the present application means "at least based on XX" and includes a case of being based on another element in addition to XX. Moreover, "on the basis of XX" is not limited to a case of using XX directly, but also includes a case of being based on what has been calculated or processed with respect to XX. "XX" is an arbitrary element (for example, arbitrary information).

Embodiment

Figure 1:
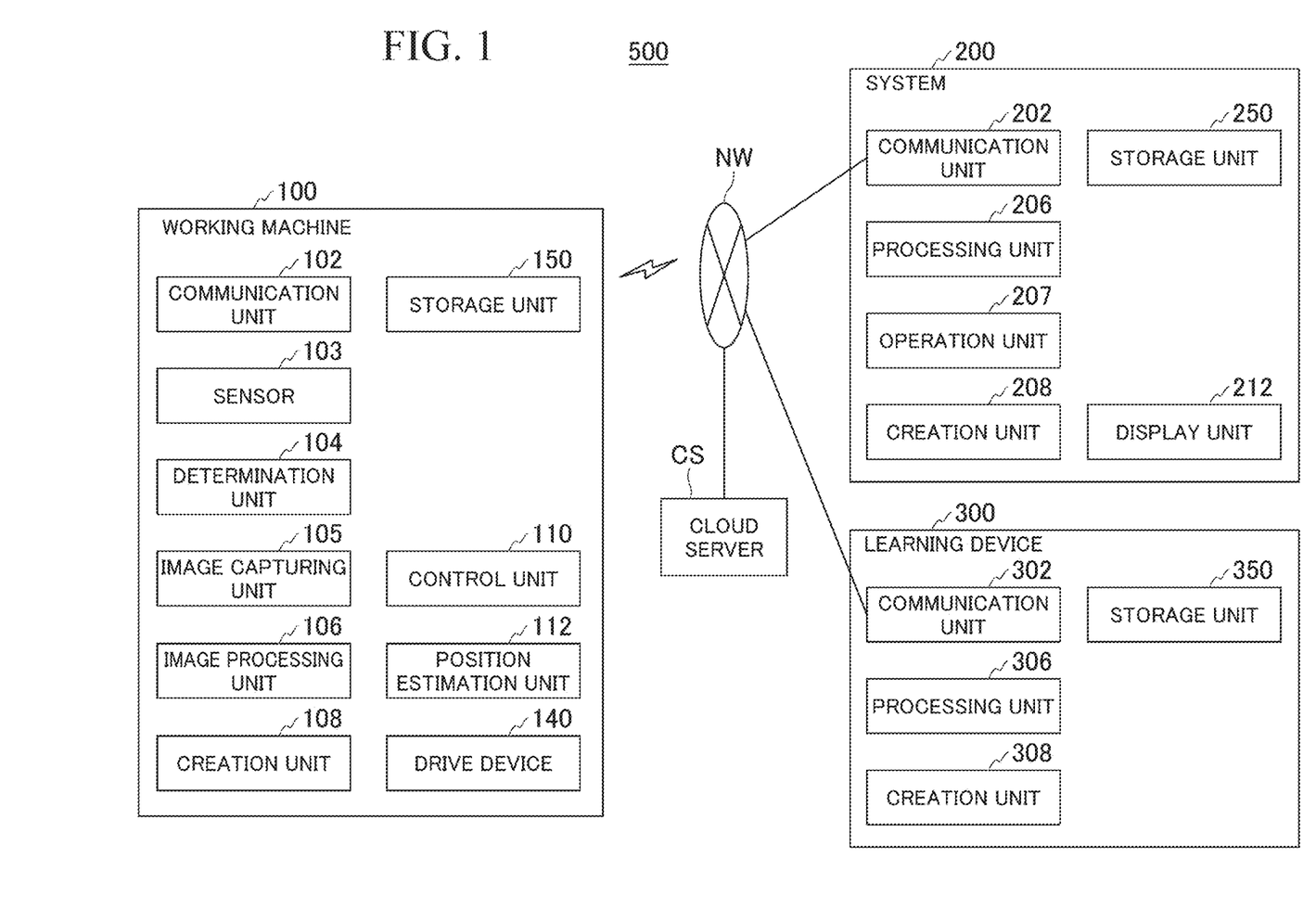
FIG. 1 is a diagram for explaining an example of a control system of a working machine according to the present embodiment.

Hereinafter, embodiments of the present invention will be described in detail with reference to the drawings. FIG. 1 is a diagram for explaining an example of a control system of a working machine according to the present embodiment. A control system 500 of the working machine includes a working machine 100, a system 200, a learning device 300, and a cloud server CS. The working machine 100, the system 200, the learning device 300, and the cloud server CS communicate with each other via a network NW. The network NW includes, for example, the Internet, a Wide Area Network (WAN), a local area network (LAN), a provider device, a radio base station, and the like.

The working machine 100 is an autonomously traveling vehicle and travels along a route through navigation by the system 200. Preparations before operation will be explained. The working machine 100 is made to travel in a working area such as a construction site where an operation is planned. For example, the working machine 100 is made to travel by wirelessly transmitting a movement command from the system 200 to the working machine 100. The working machine 100 is equipped with a camera, captures an image of the surroundings of the working machine 100 by the camera while traveling and saves a plurality of first original images of the working area obtained by capturing an image.

The working machine 100 acquires a plurality of second images in which tonal information of the plurality of first images obtained by capturing an image has been reduced. For example, the working machine 100 converts a plurality of original color images of the working area into a plurality of grayscale images with reduced tonal information.

The working machine 100 transmits a plurality of pieces of learning data, in which first image information of the first image is associated with second image information of the second image obtained by reducing the tonal information from the first image, to the cloud server CS. The cloud server CS receives a plurality of pieces of learning data transmitted by the working machine 100. The cloud server CS stores a plurality of pieces of learning data.

The learning device 300 acquires a plurality of pieces of learning data stored in the cloud server CS. The learning device 300 creates a learning model, by performing machine learning on a relationship between the colors included in the first image and the colors included in the second image, using the first image information and the second image information included in each of the acquired plurality of pieces of learning data. The learning device 300 creates a learning model notification including the created learning model. The learning device 300 transmits the created learning model notification to the system 200.

The system 200 receives the learning model notification transmitted from the learning device 300. The system 200 acquires the learning model included in the received learning model notification and stores and sets the acquired learning model.

Figure 2A:
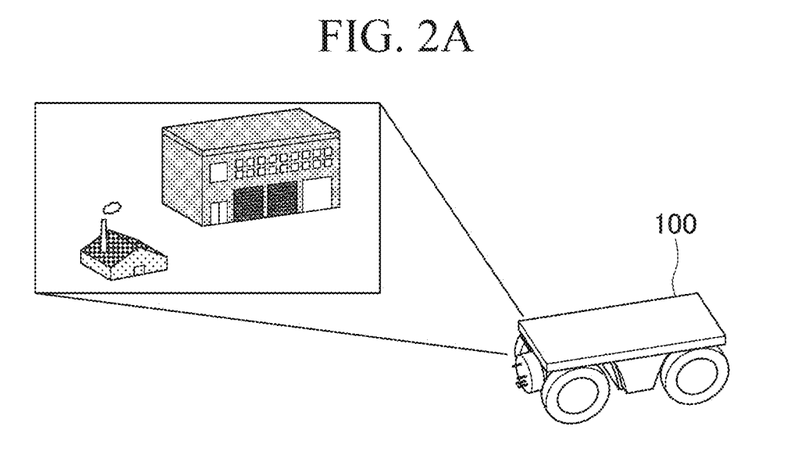
FIG. 2A is a diagram for explaining an example of the operation of the control system of the working machine according to the present embodiment.
Figure 2B:
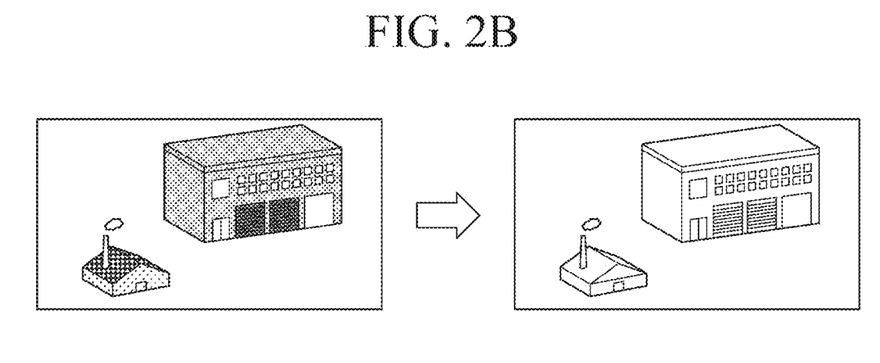
FIG. 2B is a diagram for explaining an example of the operation of the control system of the working machine according to the present embodiment.

FIGS. 2A to 2D are diagrams for explaining an example of the operation of the control system of the working machine according to the present embodiment. The working machine 100 travels along a route through navigation by the system 200. For example, the working machine 100 travels along a route of the working area. As shown in FIG. 2A, the working machine 100 captures an image of the surroundings of the working machine 100 in a situation in which determinations of autonomous travel are difficult. As shown in FIG. 2B, the working machine 100 converts a color image obtained by capturing the image of the surroundings of the working machine 100 into a grayscale image.

Figure 2C:
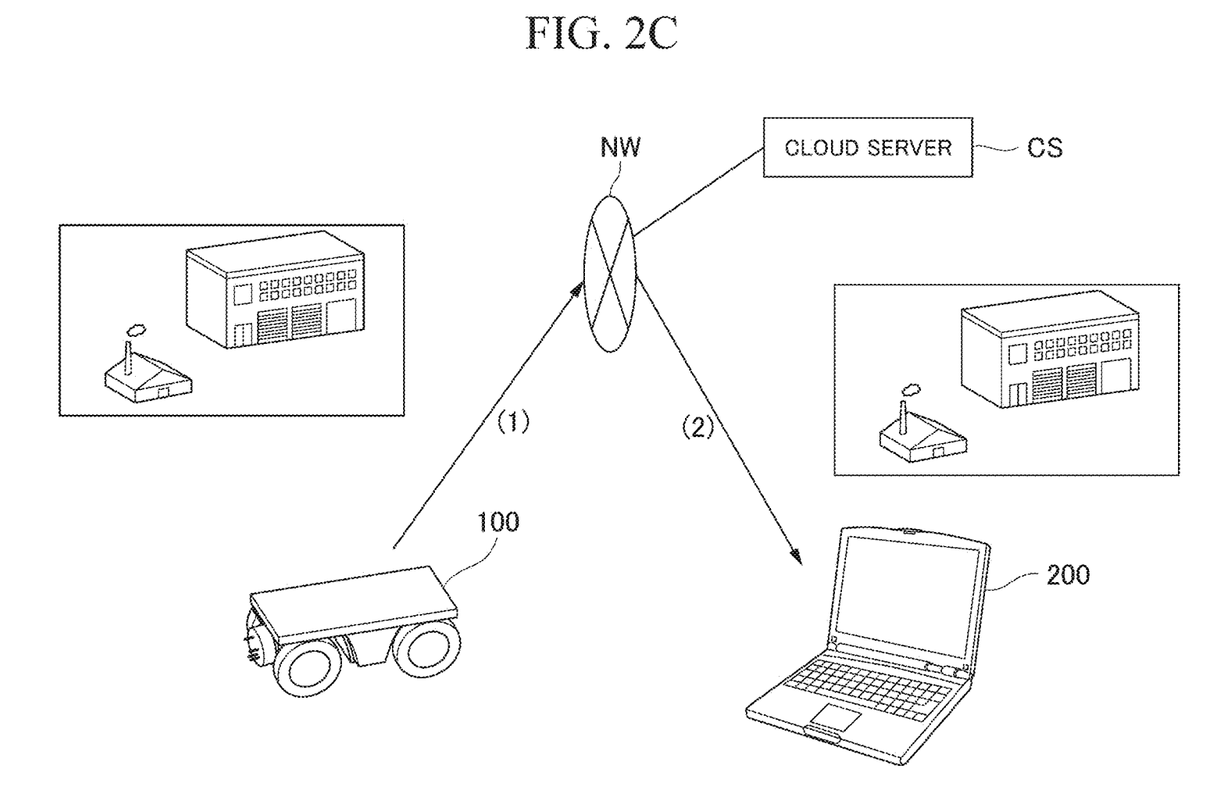
FIG. 2C is a diagram for explaining an example of the operation of the control system of the working machine according to the present embodiment.

The working machine 100 transmits the image information of the grayscale image from the working machine side to the cloud server CS, as shown in (1) of FIG. 2C. The cloud server CS receives the image information of the grayscale image transmitted by the working machine 100. The cloud server CS temporarily stores the image information of the received grayscale image and transmits it to the system 200.

The system 200 includes a learning model created by performing a machine learning on a relationship between the colors included in the first images and the colors included in the second image, using a plurality of first original images of the working area and a plurality of second images in which tonal information is reduced from each of the plurality of first original images.

The system 200 receives the image information of the grayscale image transmitted by the cloud server CS, as shown in (2) of FIG. 2C. The system 200 inputs the image information of the received grayscale image to the learning model and acquires the image information of the color image that is output by the learning model. By configuring in this manner, the color image can be restored from the grayscale image. The system 200 displays the color image by obtaining the image information of the obtained color image.

Figure 2D:
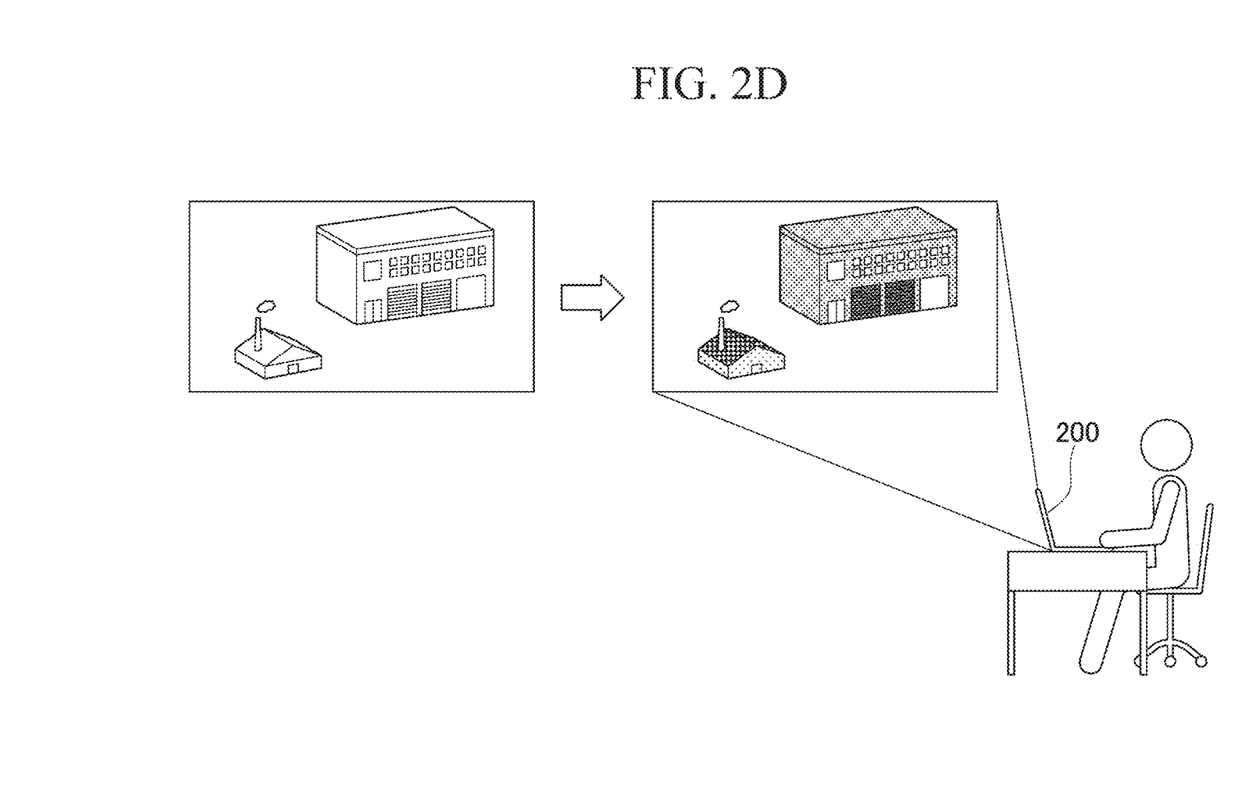
FIG. 2D is a diagram for explaining an example of the operation of the control system of the working machine according to the present embodiment.

The operator of the working machine 100 remotely operates the working machine 100 by referring to the color image displayed on the system 200, as shown in FIG. 2D. The system 200 creates a movement command (control information) on the basis of operation of the operator and transmits the created movement command to the working machine 100. The working machine 100 receives the movement command transmitted by the system 200 and operates on the basis of the received movement command.

Returning to FIG. 1, the working machine 100, the system 200, and the learning device 300 according to the present embodiment will be described in detail.

(Working Machine 100)

The working machine 100 includes a communication unit 102, a sensor 103, a determination unit 104, an image capturing unit 105, an image processing unit 106, a creation unit 108, a control unit 110, a position estimation unit 112, a drive device 140 and a storage unit 150.

The communication unit 102 is implemented by a communication module. The communication unit 102 communicates with an external communication device via the network NW. The communication unit 102 communicates, for example, in a wireless communication manner such as via a wireless LAN, Bluetooth (registered trademark) or LTE (registered trademark). The communication unit 102 holds communication information necessary for communicating with the system 200, the learning device 300, and the cloud server CS via the network NW.

For example, the sensor 103 measures a distance to any object in a traveling direction of the working machine 100. The sensor 103 is configured to have, for example, Light Detection And Ranging (LiDAR). LiDAR measures a three-dimensional distance to an object to be measured, and extracts point cloud data from the measured three-dimensional distance.

The determination unit 104 acquires the point cloud data from the sensor 103 and determines whether the traveling direction of the working machine 100 is that of a situation in which determinations of autonomous travel are difficult, on the basis of the acquired point cloud data. An example of a situation in which it is difficult to determine the autonomous travel is a situation in which the working machine 100 is at an intersection. The determination unit 104 instructs the image capturing unit 105 to take an image when determining that it is difficult to determine the autonomous travel.

The image capturing unit 105 acquires the color image information by capturing the image of the surroundings of the working machine 100. In preparation before operation, the image capturing unit 105 acquires the image information of the first image by capturing the image of the surroundings of the working machine 100, when the working machine 100 is traveling on the basis of a movement command from the system 200. In addition, when an image capturing command is input by the determination unit 104 at the time of operation, the image capturing unit 105 acquires the image information of a color image by capturing the image of the surroundings such as those in the traveling direction of the working machine 100. Here, the image information of the color image is image information of an image whose colors are represented by the three primary colors of light "red (R), green (G), and blue (B)".

The image processing unit 106 acquires the image information of the color image from the image capturing unit 105 and converts the acquired image information of the color image into the image information of the grayscale image. Here, the image information of the grayscale image represents one pixel with 8 bits and does not include color information and includes only brightness information. This 8-bit image can express gradations up to 2 to the power of 8 (=256). A pixel value of 0 is black, and a pixel value of 255 is white. The image processing unit 106 acquires the image information of the first image from the image capturing unit 105 and converts the acquired image information of the first image into the image information of the second image in preparation before operation. The image processing unit 106 acquires the image information of a color image from the image capturing unit 105 at the time of operation and converts the acquired image information of the color image into the image information of the grayscale image.

The creation unit 108 creates a plurality of pieces of learning data in which the image information of the first image and the image information of the second image are associated from the image processing unit 106. The creation unit 108 transmits the created plurality of pieces of learning data from the communication unit 102 to the learning device 300. The creation unit 108 also acquires the grayscale image information from the image processing unit 106. The creation unit 108 creates an image notification including the acquired grayscale image information and the identification information of the working machine 100 and transmits the created image notification from the communication unit 102 to the system 200.

The position estimation unit 112 estimates the position of the working machine 100. For example, the position estimation unit 112 is configured to include a global navigation satellite system (GNSS), and performs a position measurement, using signals emitted from navigation satellites.

The control unit 110 acquires the positional information of the working machine 100 from the position estimation unit 112 and controls the travel of the working machine 100 to pass through the route that is set by the system 200 on the basis of the acquired positional information. The control unit 110 controls the travel of the working machine 100, by outputting a shaft speed of wheels and the like to the drive device 140 as a movement command.

The storage unit 150 is implemented by a Hard Disk Drive (HDD), a flash memory, a Random Access Memory (RAM), a Read Only Memory (ROM), and the like, and stores information.

The drive device 140 is made up of an actuator (not shown), an encoder and a control device thereof, and a movement mechanism having a plurality of combinations of wheels and steering shafts connected to the output shaft of the actuator. The movement mechanism is driven on the basis of a movement command from the control unit 110 and a movement command from the system 200.

The determination unit 104, the image processing unit 106, the creation unit 108, the control unit 110, and the position estimation unit 112 are implemented, for example, by executing a computer program (software) stored in the storage unit 150 by a hardware processor such as a Central Processing Unit (CPU).

Also, some or all of these functional units may be implemented by hardware (a circuit unit including circuitry) such as a Large Scale Integration (LSI), an Application Specific Integrated Circuit (ASIC), a Field-Programmable Gate Array (FPGA), and a Graphics Processing Unit (GPU), or may be implemented by cooperation of software and hardware.

The computer program may be stored in a storage device such as an HDD or a flash memory in advance or may be stored in a detachable storage medium such as a Digital Versatile Disc (DVD) or a CD-ROM, and may be installed by mounting the storage medium to the drive device.

(System 200)

The system 200 is implemented by a device such as a personal computer, a server, a smart phone, a tablet computer or an industrial computer. The system 200 controls the travel of the working machine 100. The system 200 includes a communication unit 202, a processing unit 206, an operation unit 207, a creation unit 208, a display unit 212, and a storage unit 250.

The communication unit 202 is implemented by a communication module. The communication unit 202 communicates with an external communication device via the network NW. The communication unit 202 communicates, for example, in a wireless communication manner such as a wireless LAN, a Bluetooth (registered trademark) or a LTE (registered trademark). The communication unit 202 holds communication information necessary for communicating with the working machine 100, the learning device 300, and the cloud server CS via the network NW. The communication unit 202 receives the learning model notification transmitted by the learning device 300 and receives the image notification transmitted by the working machine 100.

The processing unit 206 acquires the learning model notification received by the communication unit 202 and acquires the learning model included in the acquired learning model notification. The processing unit 206 stores and sets the acquired learning model. As described above, the learning model is created by performing a machine learning a relationship between the colors included in the first image and the colors included in the second image, using a plurality of first original images of the working area and a plurality of second images in which tonal information is reduced from each of the plurality of first original images.

The processing unit 206 acquires the image notification from the communication unit 202 and acquires the image information of the grayscale image and the identification information of the working machine 100 included in the acquired image notification. The processing unit 206 inputs the acquired image information of the grayscale image to the learning model and acquires the image information of the color image that is output by the learning model. The processing unit 206 outputs the image information of the color image to the display unit 212.

The operation unit 207 is an input device that receives operation of the operator. Specifically, the operation unit 207 creates the travel control information when the operator operates the operation unit 207 to perform an operation of controlling the travel of the working machine 100.

The creation unit 208 acquires the travel control information from the operation unit 207 and creates a movement command on the basis of the acquired travel control information. The creation unit 208 transmits the created movement command from the communication unit 202 to the working machine 100.

The display unit 212 is configured to include, for example, a touch panel. The display unit 212 acquires the color image information that is output from the processing unit 206 and displays a screen that accepts the operation for controlling the travel of the working machine 100 by the operator on the basis of the acquired color image information.

The storage unit 250 is implemented by an HDD, a flash memory, a RAM, a ROM, and the like, and stores information.

The processing unit 206, the operation unit 207, and the creation unit 208 are implemented by, for example, executing a computer program (software) stored in the storage unit 250 by a hardware processor such as a CPU.

Also, some or all of these functional units may be implemented by hardware (circuit unit including circuitry) such as an LSI, an ASIC, a FPGA, and a GPU, or may be implemented by cooperation of software and hardware.

The computer program may be stored in a storage device such as an HDD or a flash memory in advance or may be stored in a detachable storage medium such as a DVD or CD-ROM, and may be installed by mounting the storage medium to the drive device.

(Learning Device 300)

The learning device 300 is implemented by a device such as a personal computer, a server, a smart phone, a tablet computer or an industrial computer. The learning device 300 creates a learning model. The learning device 300 includes a communication unit 302, a processing unit 306, a creation unit 308 and a storage unit 350.

The communication unit 302 is implemented by a communication module. The communication unit 302 communicates with an external communication device via the network NW. The communication unit 302 communicates, for example, in a wireless communication manner such as a wireless LAN, a Bluetooth (registered trademark) or an LTE (registered trademark). The communication unit 302 holds communication information necessary for communicating with the working machine 100, the system 200, and the cloud server CS via the network NW. The communication unit 302 receives the learning data transmitted by the cloud server CS and transmits the learning model notification created by the creation unit 308 to the system 200.

The processing unit 306 acquires a plurality of pieces of learning data received by the communication unit 302. The processing unit 306 acquires a combination of the image information of the first image and the image information of the second image included in each of the plurality of pieces of acquired learning data. The processing unit 306 creates a learning model, by performing machine learning on the relationship between the colors included in the first image and the colors included in the second image, using the combination of the acquired image information of the first image and the acquired image information of the second image. For example, the processing unit 306 creates a learning model, using algorithms used in unsupervised learning such as generative adversarial networks (GAN).

The creation unit 308 acquires the learning model from the processing unit 306. The creation unit 308 creates a learning model notification including the acquired learning model. The creation unit 308 outputs the created learning model notification to the communication unit 302.

The communication unit 302 transmits the learning model notification, which is output by the creation unit 308, to the system 200.

The storage unit 350 is implemented by an HDD, a flash memory, a RAM, a ROM, and the like, and stores information.

The processing unit 306 and the creation unit 308 are implemented, for example, by executing a computer program (software) stored in the storage unit 350 by a hardware processor such as a CPU.

Also, some or all of these functional units may be implemented by hardware (circuit unit including circuitry) such as an LSI, an ASIC, a FPGA and a GPU, or may be implemented by cooperation of software and hardware.

The computer program may be stored in a storage device such as an HDD or a flash memory in advance or may be stored in a detachable storage medium such as a DVD or a CD-ROM, and may be installed by mounting the storage medium to a drive device.

(Operations of Working Machine 100, System 200, and Learning Device 300)

Figure 3:
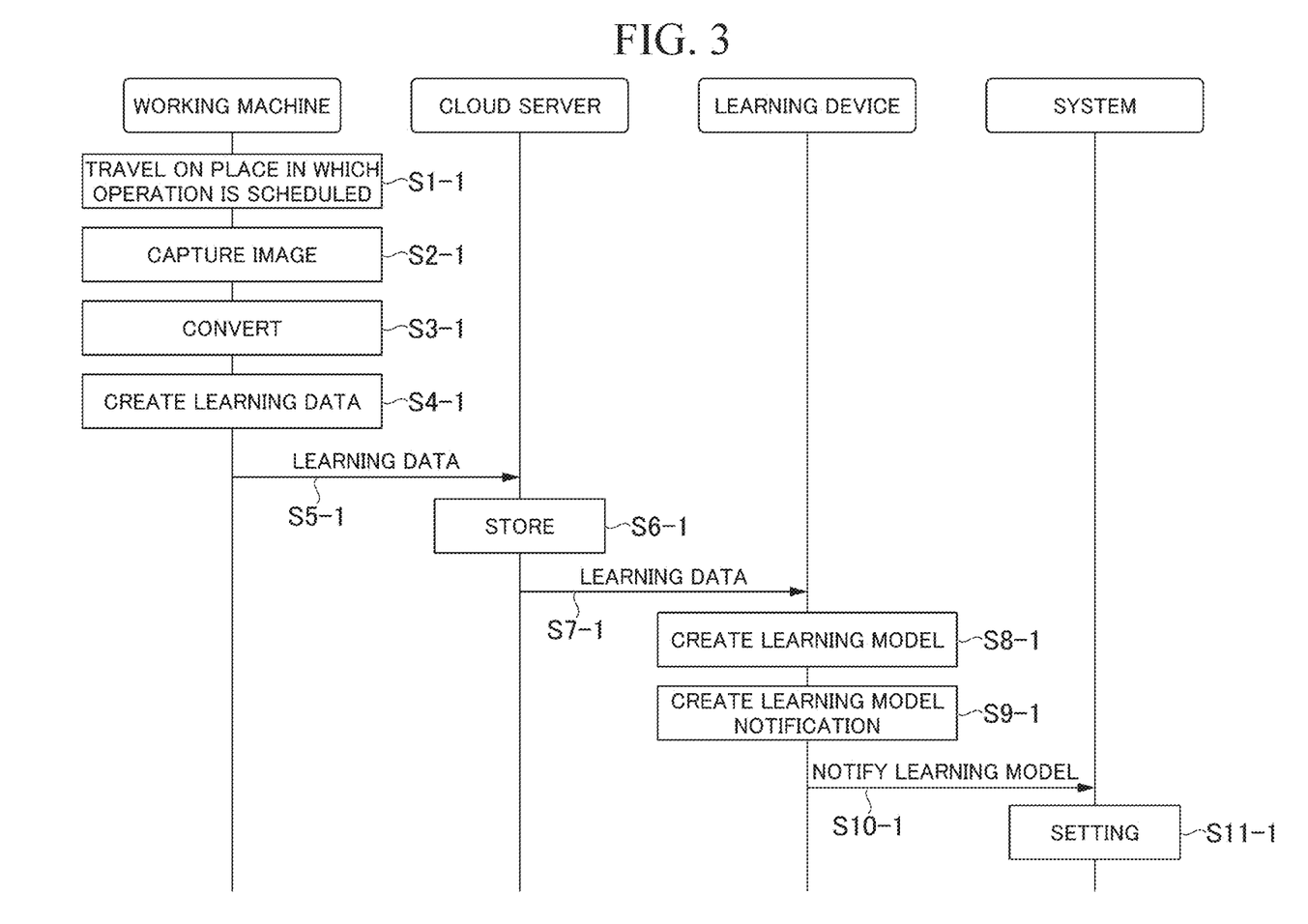
FIG. 3 is a flowchart showing an example of the operation of the working machine, a system, a learning device, and a cloud server according to the present embodiment.

FIG. 3 is a flow chart showing an example of the operation of the working machine, the system, the learning device, and the cloud server according to the present embodiment. Preparations before operation will be described with reference to FIG. 3.

(Step S1-1)

The working machine 100 travels along a route of a working area such as a construction site in which the operation is scheduled.

(Step S2-1)

In the working machine 100, the image capturing unit 105 acquires image information of the first image by capturing the image of the surroundings of the working machine 100.

(Step S3-1)

In the working machine 100, the image processing unit 106 acquires the image information of the first image from the image capturing unit 105. The image processing unit 106 converts the acquired image information of the first image into image information of the second image.

(Step S4-1)

In the working machine 100, the creation unit 108 creates a plurality of pieces of learning data in which the image information of the first image and the image information of the second image are associated from the image processing unit 106.

(Step S5-1)

In the working machine 100, the creation unit 108 transmits the created plurality of pieces of learning data from the communication unit 102 to the cloud server CS.

(Step S6-1)

The cloud server CS receives a plurality of pieces of learning data transmitted by the working machine 100 and stores the received plurality of pieces of learning data.

(Step S7-1)

The cloud server CS transmits a plurality of pieces of learning data to the learning device 300.

(Step S8-1)

In the learning device 300, the communication unit 302 receives a plurality of pieces of learning data transmitted by the cloud server CS. The processing unit 306 acquires a plurality of pieces of learning data received by the communication unit 302. The processing unit 306 acquires a combination of the image information of the first image and the image information of the second image included in each of the plurality of pieces of acquired learning data. The processing unit 306 creates a learning model, by performing machine learning on the relationship between the colors included in the first image and the colors included in the second image, using a combination of the acquired image information of the first image and the acquired image information of the second image.

(Step S9-1)

In the learning device 300, the creation unit 308 acquires the learning model from the processing unit 306. The creation unit 308 creates a learning model notification including the acquired learning model.

(Step S10-1)

In the learning device 300, the creation unit 308 transmits the created learning model notification from the communication unit 302 to the system 200.

(Step S11-1)

In the system 200, the communication unit 202 receives the learning model notification transmitted by the learning device 300. The processing unit 206 acquires the learning model notification received by the communication unit 202 and acquires the learning model included in the acquired learning model notification. The processing unit 206 stores and sets the acquired learning model.

Figure 4:
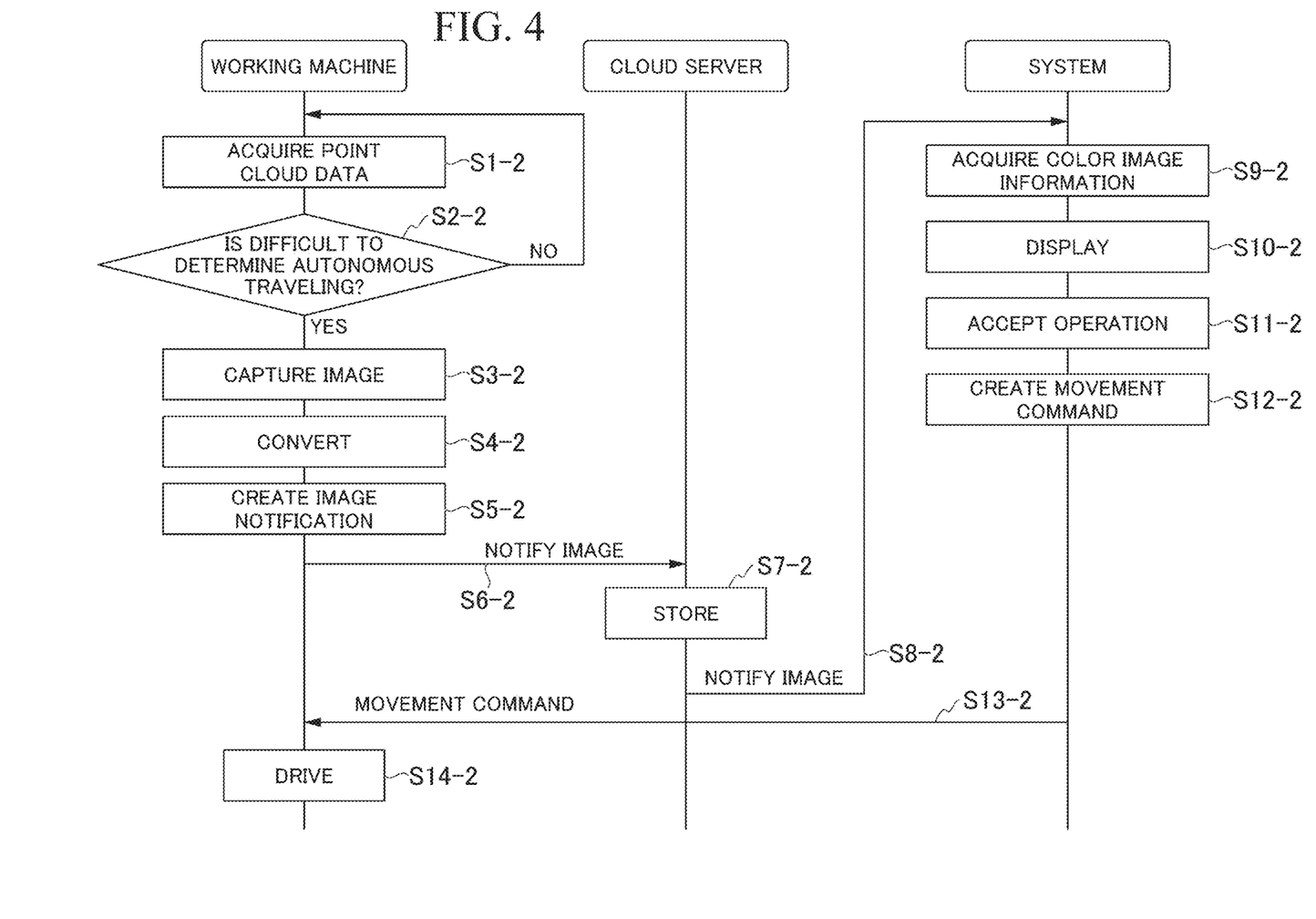
FIG. 4 is a flowchart showing an example of the operation of the working machine, the system and the cloud server according to the present embodiment.

FIG. 4 is a flowchart showing an example of the operation of the working machine, the system, and the cloud server according to the present embodiment. Operation at the time of operation will be described with reference to FIG. 4.

(Step S1-2)

The working machine 100 travels along a route through navigation by the system 200. The sensor 103 measures a three-dimensional distance to an object to be measured, and extracts point cloud data from the measured three-dimensional distance.

(Step S2-2)

In the working machine 100, the determination unit 104 acquires the point cloud data from the sensor 103 and determines whether the traveling direction of the working machine 100 is in a situation in which determination of the autonomous travel is difficult, on the basis of the acquired point cloud data. If the determination unit 104 determines that the traveling direction of the working machine 100 is not in a situation in which determination of autonomous travel is difficult, the process returns to step S1-2.

(Step S3-2)

In the working machine 100, the determination unit 104 commands the image capturing unit 105 to capture an image when it is determined that there is a situation in which determination of the autonomous travel is difficult. The image capturing unit 105 acquires color image information by capturing the image of the surroundings of working machine 100, when the determination unit 104 inputs an image capturing command.

(Step S4-2)

In the working machine 100, the image processing unit 106 acquires image information of a color image from the image capturing unit 105. The image processing unit 106 converts the acquired image information of a color image into image information of a grayscale image.

(Step S5-2)

In the working machine 100, the creation unit 108 acquires the image information of a grayscale image from the image processing unit 106. The creation unit 108 creates an image notification including the image information of the acquired grayscale image and the identification information of the working machine 100.

(Step S6-2)

In the working machine 100, the creation unit 108 transmits the created image notification from the communication unit 102 to the cloud server CS.

(Step S7-2)

The cloud server CS receives the image notification transmitted by the working machine 100 and stores the received image notification.

(Step S8-2)

The cloud server CS transmits the image notification to the system 200.

(Step S9-2)

In the system 200, the communication unit 202 receives the image notification transmitted by the cloud server CS. The processing unit 206 acquires the image notification from the communication unit 202 and acquires the image information of the grayscale image and the identification information of the working machine 100 included in the acquired image notification. The processing unit 206 inputs the acquired image information of the grayscale image to the learning model and acquires the image information of the color image that is output by the learning model.

(Step S10-2)

In the system 200, the processing unit 206 outputs the acquired image information of the color image to the display unit 212. The display unit 212 acquires the image information of the color image that is output by the processing unit 206 and displays a screen that accepts an operation for controlling the travel of the working machine 100 by the operator on the basis of the acquired image information of the color image.

(Step S11-2)

In the system 200, the operation unit 207 creates travel control information when the operator operates the operation unit 207 to perform an operation for controlling the travel of the working machine 100.

(Step S12-2)

In the system 200, the creation unit 208 acquires travel control information from the operation unit 207 and creates a movement command on the basis of the acquired travel control information.

(Step S13-2)

In the system 200, the creation unit 208 transmits the created movement command from the communication unit 202 to the working machine 100.

(Step S14-2)

In the working machine 100, the communication unit 102 receives the movement command transmitted by the system 200. The movement mechanism acquires a movement command from the communication unit 102 and drives on the basis of the acquired movement command.

In the above-described embodiment, although a case in which the learning data is acquired by learning device 300 from the working machine 100 via the cloud server CS, and the image notification is acquired by the system 200 from the working machine 100 via the cloud server CS has been described as an example, the present invention is not limited to this example. For example, a configuration in which the learning data is acquired by the learning device 300 from the working machine 100 without going through the cloud server CS, and the image notification is acquired by the system 200 from the working machine 100 without going through the cloud server CS may be adopted.

In the above-described embodiment, although a case in which the determination unit 104 acquires the point cloud data from the sensor 103 and determines whether the traveling direction of the working machine 100 is in a situation in which determination of the autonomous travel is difficult, on the basis of the acquired point cloud data has been described as an example, the present invention is not limited to this example. For example, the determination unit 104 may acquire an image of the traveling direction of the working machine 100 from the image capturing unit 105 and may determine whether the traveling direction of the working machine 100 is in a situation in which determination of the autonomous travel is difficult, on the basis of the acquired image.

In the above-described embodiment, although a case in which the working machine 100 converts a color image into a grayscale image and transmits the grayscale image from the working machine 100 to the system 200 has been described, the present invention is not limited to this example. For example, the working machine 100 may create an image obtained by lowering a resolution of the grayscale image and may transmit the image obtained by lowering the resolution of the grayscale image from the working machine 100 to the system 200. In this case, the system 200 restores a color image from the image obtained by lowering the resolution of the grayscale image, by the use of a learning model which is created using the original image of the working area, and the image obtained by lowering the resolution of the image in which the tonal information is reduced from the original image.

Because the size of the image transmitted from the working machine 100 to the system 200 can be further reduced, compared to a case where the grayscale image is transmitted from the working machine 100 by such a configuration, even lower delay can be achieved.

According to the control system 500 of the working machine 100 of the embodiment, the control system 500 of the working machine 100 operates the working machine 100 using an image from the working machine side. The working machine 100 includes an image processing unit 106 that converts a color image into a grayscale image, and a working machine communication unit as the communication unit 102 that transmits the grayscale image from the working machine side to the system side. The system 200 includes a system communication unit as a communication unit 202 that receives a grayscale image transmitted by the working machine 100, and a processing unit 206 that restores a color image from the grayscale image, by the use of the learning model which is created, using an original image of the working area, and an image in which the tonal information is reduced from the original image.

The system 200 can restore a color image from a grayscale image, by the use of a learning model which is created, using an original image of the work area, and an image in which the tonal information is reduced from the original image, by such a configuration. Therefore, the working machine 100 can report the situation to the operator of the system 200 with low delay, by converting the color image into a grayscale image and transmitting the grayscale image to the system 200.

When a remote control becomes necessary, the working machine 100 transmits the image information of a grayscale image, which is obtained by converting the image information of a color image, to the system 200. Since the size of image information of a grayscale image is about one third of that of a color image, the delay is reduced, by transmitting the image information of a grayscale image, compared to a case of transmitting the image information of a color image. The system 200 inputs the image information of the grayscale image transmitted by the working machine 100 to the learning model and acquires the image information of the color image that is output by the learning model. As a result, it is possible to obtain a color image that clearly shows a sign or the like at a construction site, for example, while the delay is low.

In the control system 500 of the working machine 100, the image processing unit 106 creates an image obtained by lowering the resolution of the grayscale image, and the working machine communication unit transmits the image obtained by lowering the resolution of the grayscale image from the working machine side to the system side. The system communication unit receives an image obtained by lowering the resolution of the grayscale image, which is transmitted by the working machine 100, and the processing unit 206 restores a color image from the image obtained by lowering the resolution of the grayscale image, by the use of a learning model that is created, using the original image of the working area, and the image obtained by lowering the resolution of the image in which the tonal information is reduced from the original image.

With such a configuration, the system 200 can restore a color image from an image obtained by lowering the resolution of the grayscale image, by the use of a learning model that is created, using the original image of the working area, and an image obtained by lowering the resolution of the image in which the tonal information is reduced from the original image. The capacity of the image information obtained by lowering the resolution of the grayscale image is further reduced than the capacity of the image information of the grayscale image. Therefore, the working machine 100 can report the situation to the operator of the system 200 with even less delay than in the case of transmitting the image information of a grayscale image.

Modified Example of Embodiment

FIG. 1 can be applied to the modified example of the present embodiment. However, it differs in that a working machine 100*a* is provided instead of the working machine 100. The working machine 100*a* differs in that it has a function of determining whether to learn the learning model again, in addition to the function of the working machine 100.

Figure 5:
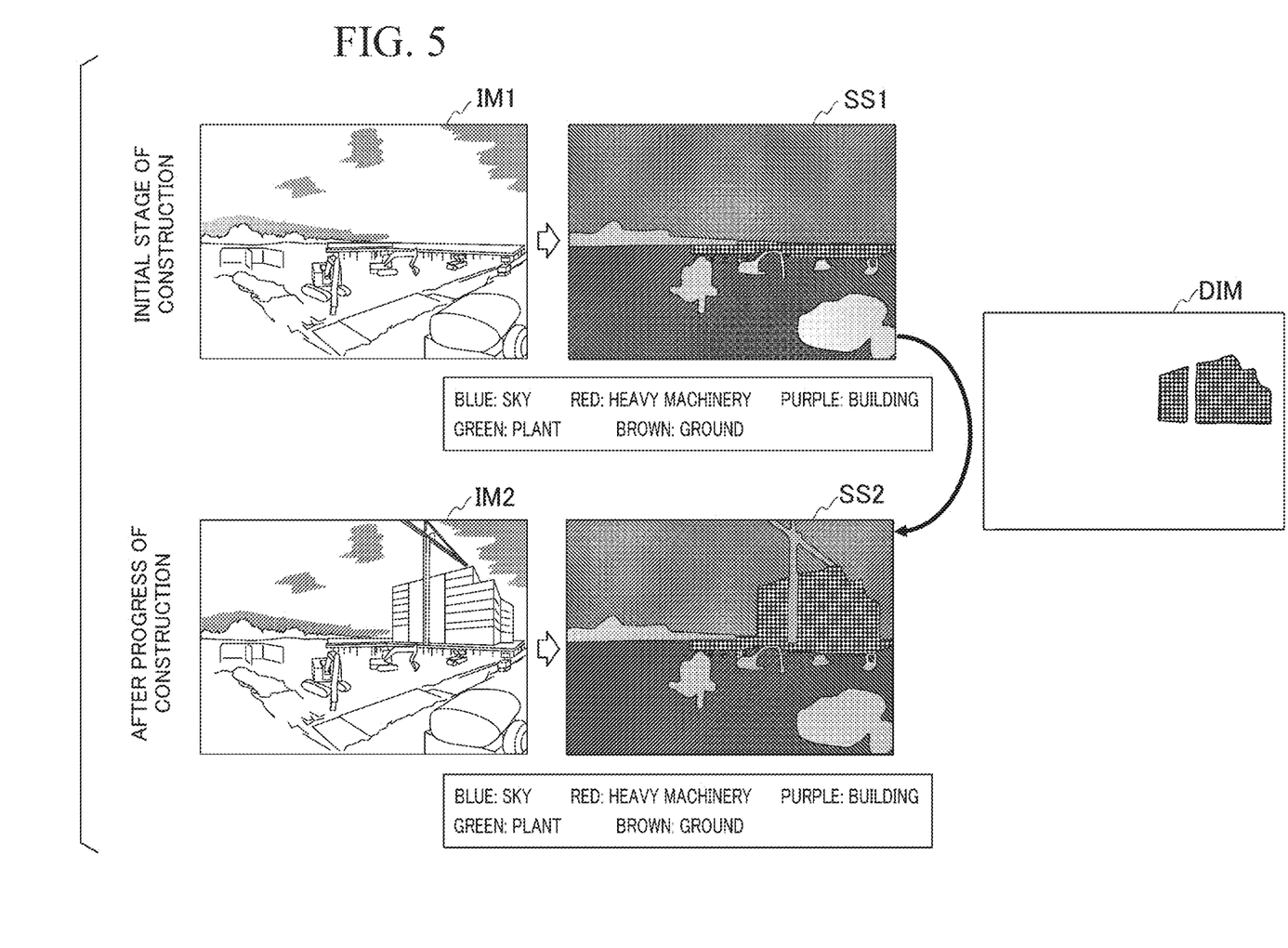
FIG. 5 is a diagram for explaining an example of the operation of the working machine according to a modified example of the embodiment.

FIG. 5 is a diagram for explaining an example of the operation of the working machine according to the modified example of the present embodiment. For example, when operating the working machine 100*a* at a construction site, there is a case where new structures may appear as the progress of construction. The learning data used to create the learning model does not include image information of the structures. For this reason, there is a risk of a large difference between the color image obtained from the image information of the color image that is output when the image information of the grayscale image is input to the learning model, and the color image obtained from the image information of the color image before being converted into the image information of the grayscale image.

The working machine 100*a* captures an image of the surroundings of the working machine 100*a* at an initial stage of construction. The working machine 100*a* stores one or a plurality of images IM1 of the working area acquired by capturing the image of the surroundings of the working machine 100*a* in association with positional information at the time of image capturing and information indicating the attitude of the working machine 100*a* at the time of image capturing. An example of positional information is represented by a longitude and a latitude, and an example of information indicating the attitude is represented by a slope of the working machine 100*a* with respect to a predetermined direction such as north.

The working machine 100*a* captures an image of the surroundings of the working machine 100*a* after the progress of construction. The working machine 100*a* stores one or a plurality of images IM2 of the working area acquired by capturing the image of the surroundings of working machine 100*a*, in association with positional information at the time of image capturing and information indicating the attitude of working machine 100*a* at the time of image capturing. Here, the positional information when one or a plurality of images IM2 are captured and the information indicating the attitude of working machine 100*a* at the time of image capturing may be the same as the positional information when one or a plurality of images IM1 are captured and the information indicating the attitude of the working machine 100*a* at the time of image capturing, in the early stage of construction.

The working machine 100*a* divides a plurality of object regions included in each of one or a plurality of images IM1 of the working area acquired at the initial stage of construction and one or a plurality of images IM2 of the working area acquired after the progress of construction. In FIG. 5, as an example, a plurality of object regions are divided by different hatchings. The working machine 100*a* acquires one or a plurality of images SS1 by dividing a plurality of object regions included in one or a plurality of images IM1 of the working area and acquires one or a plurality of images SS2 by dividing a plurality of object regions included in one or a plurality of images IM2 of the working area.

The working machine 100*a* determines whether to update the learning model on the basis of the acquired one or a plurality of images SS1 and one or a plurality of images SS2. For example, the working machine 100*a* determines whether to relearn the learning model on the basis of a change in image SS2 with respect to the image SS1. Specifically, the working machine 100*a* creates a difference image DIM between the image SS1 and the image SS2. Here, the image SS1 and the image SS2 are acquired from the image IM1 and the image IM2 captured at the same position and the same attitude. The working machine 100*a* determines whether the number of pixels in the difference portion is equal to or greater than a threshold value, on the basis of the created difference image DIM. The working machine 100*a* determines to relearn the learning model when the number of pixels in the difference portion is equal to or greater than the threshold value and determines not to relearn the learning model when the number of pixels in the difference portion is less than the threshold value.

When the working machine 100*a* determines to relearn the learning model, the working machine 100*a* acquires image information in which the tonal information is reduced from each piece of the image information of one or a plurality of images IM2. For example, the working machine 100*a* converts the information into image information of a grayscale image in which tonal information is reduced from the image information of one or a plurality of images IM2.

The working machine 100*a* transmits, to cloud server CS, one or plural pieces of learning data in which image information of one or a plurality of images IM2 are associated with the image information of image obtained by reducing the tonal information from the one or a plurality of images IM2. The cloud server CS receives one or plural pieces of learning data transmitted by the working machine 100*a*. The cloud server CS stores one or plural pieces of learning data.

Figure 6:
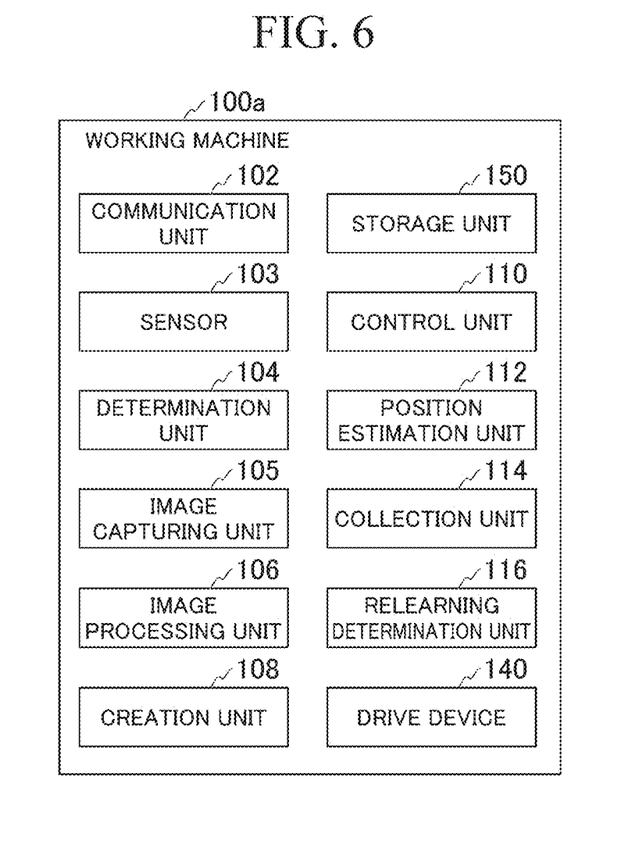
FIG. 6 is a diagram showing an example of a working machine of a modified example of the embodiment.

The working machine 100*a*, the system 200, the learning device 300, and the cloud server CS of the modified example of the embodiment will be described below in detail with respect to the working machine 100*a* that is different from the embodiment. FIG. 6 is a diagram showing an example of a working machine according to a modified example of the embodiment. The working machine 100*a* is an autonomous traveling vehicle and travels along a route through navigation by the system 200.

The working machine 100*a* includes a communication unit 102, a sensor 103, a determination unit 104, an image capturing unit 105, an image processing unit 106, a creation unit 108, a control unit 110, a position estimation unit 112, a collection unit 114, a relearning determination unit 116, a drive device 140 and a storage unit 150.

Figure 7:
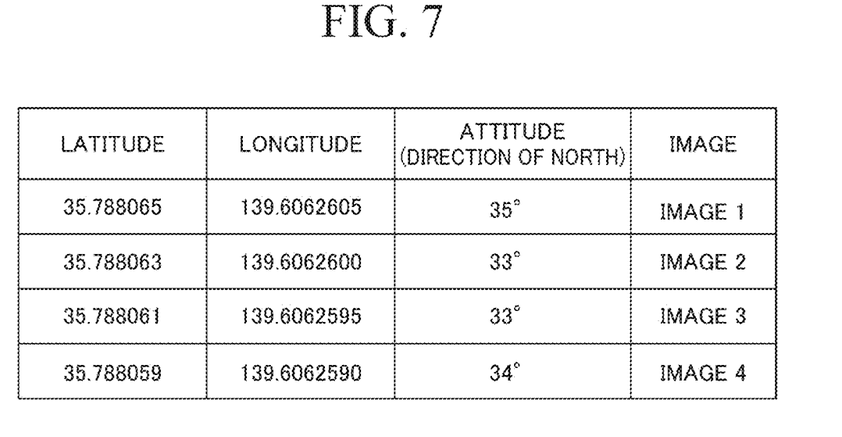
FIG. 7 is a diagram showing an example of a working area image information table.

The storage unit 150 stores a working area image information table. FIG. 7 is a diagram showing an example of the working area image information table. The working area image information table includes positional information of the working machine 100*a* when the image capturing unit 105 captures an image of the surroundings of the working machine 100*a*, and information indicating the attitude of the working machine 100*a* when the image capture unit 105 captures an image of the surroundings of the working machine 100*a*, and table type information obtained by associating one or more images of the working area acquired by capturing the image of the surroundings of the working machine 100a. Returning to FIG. 6, the description is continued.

The collection unit 114 causes the image capturing unit 105 to capture an image of the surroundings of the working machine 100a at the initial stage of construction. The collection unit 114 acquires the positional information of the working machine 100a from the position estimation unit 112, when the image capturing unit 105 captures an image of the surroundings of the working machine 100a. The collection unit 114 acquires information indicating the attitude of the working machine 100a, when the image capturing unit 105 captures an image of the surroundings of the working machine 100a. For example, the collection unit 114 may include a 3-axis gyro sensor (not shown) and acquire information indicating the attitude from the 3-axis gyro sensor. The collection unit 114 stores the image information of one or a plurality of images IM1 of the working area acquired by capturing the image of the surroundings of the working machine 100a, in the working area image information table of the storage unit 150, in association with the positional information at the time of image capturing and the information indicating the attitude of the working machine 100a at the time of image capturing.

The collection unit 114 causes the image capturing unit 105 to capture an image of the surroundings of the working machine 100a after the progress of construction. The collection unit 114 acquires the positional information of the working machine 100a from the position estimation unit 112 when the image capturing unit 105 captures the image of the surroundings of the working machine 100a. The collection unit 114 acquires information indicating the attitude of the working machine 100a when the image capturing unit 105 captures the image of the surroundings of the working machine 100a. The collection unit 114 stores the image information of one or a plurality of images IM2 of the working area acquired by capturing the image of the surroundings of working machine 100a, in the working area image information table of the storage unit 150, in association with the positional information at the time of image capturing and the information indicating the attitude of the working machine 100a at the time of image capturing.

The relearning determination unit 116 divides a plurality of object regions included in each of one or a plurality of images IM1 of the working area acquired at the initial stage of construction and one or a plurality of images IM2 of the working area acquired after the progress of construction. For example, the relearning determination unit 116 divides a sky region, a heavy machinery region, a structure region, a plant region, a ground region, and the like included in each of one or a plurality of images IM1 and one or a plurality of images IM2 of the working area. For example, the relearning determination unit 116 acquires one or a plurality of images SS1 by dividing a plurality of object regions included in each of the one or a plurality of images IM1 of the working area, and acquires one or a plurality of images SS2 by dividing a plurality of object regions included in each of the one or a plurality of images IM2 of the working area, by the use of an algorithm of deep learning in which labels and categories are associated with all pixels in the image, such as Semantic Segmentation.

The relearning determination unit 116 determines whether to relearn the learning model on the basis of the acquired one or a plurality of images SS1 and one or a plurality of images SS2. For example, the relearning determination unit 116 determines whether to relearn the learning model on the basis of a change in the image SS2 with respect to the image SS1. Specifically, the relearning determination unit 116 creates a difference image DIM between the image SS1 and the image SS2. The relearning determination unit 116 determines whether the number of pixels in the difference portion is equal to or greater than the threshold value, on the basis of the created difference image DIM. The relearning determination unit 116 determines that the learning model is relearned when updated if the number of pixels of the difference portion is equal to or greater than the threshold value, and that the learning model is not relearned if the number of pixels of the difference portion is less than the threshold value.

When it is determined that the learning model is relearned by the relearning determination unit 116, the image processing unit 106 acquires image information of one or a plurality of images IM2. The image processing unit 106 converts the acquired image information of one or a plurality of images IM2 into image information of a grayscale image.

The creation unit 108 creates a plurality of pieces of learning data in which the image information of the one or a plurality of images IM2 is associated with the image information of the grayscale image obtained by converting the image information of the one or a plurality of images IM2 from the image processing unit 106. The creation unit 108 transmits one or a plurality of pieces of created learning data from the communication unit 102 to the learning device 300.

(Operations of Working Machine 100a, System 200, Learning Device 300, and Cloud Server CS)

Figure 8:
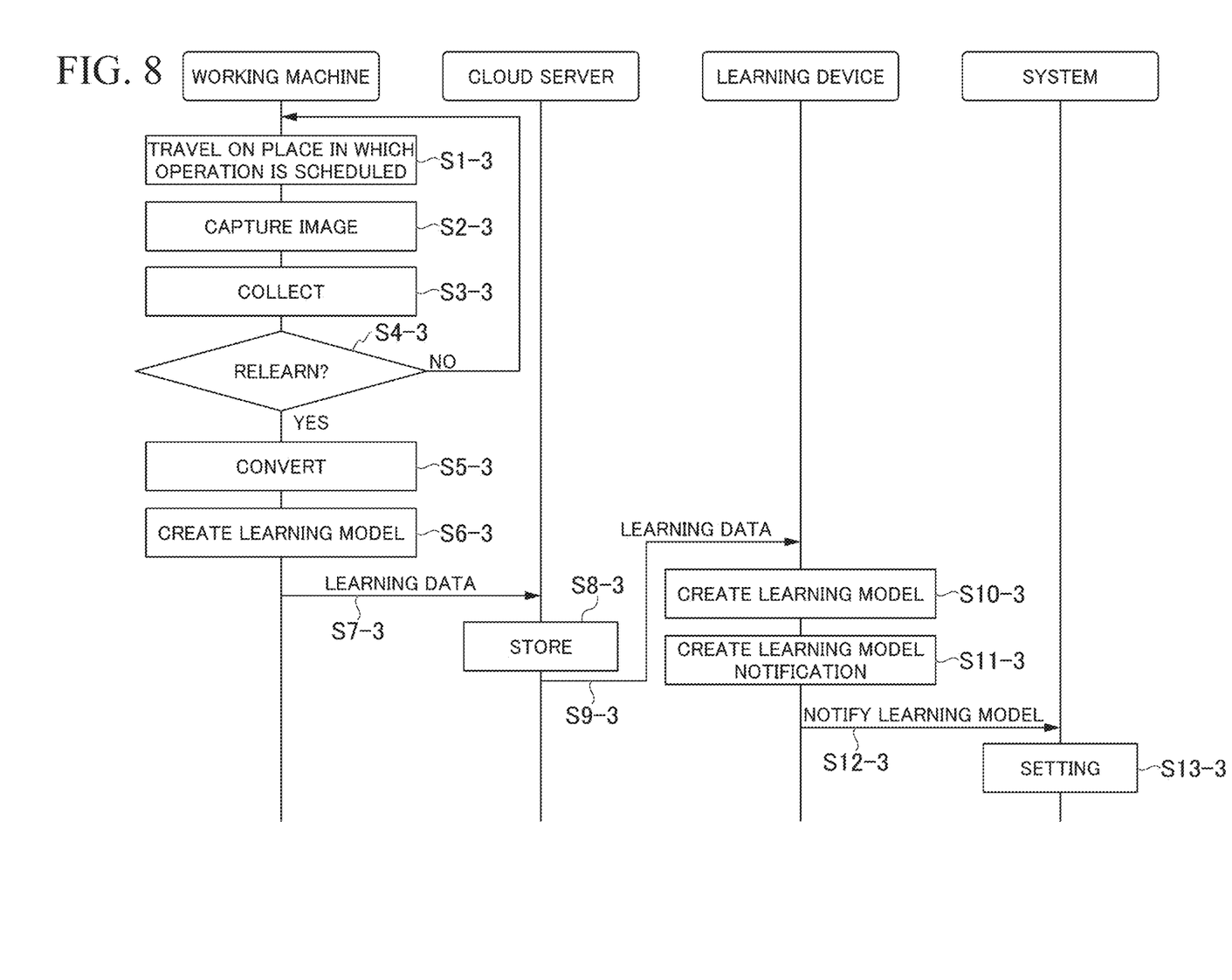
FIG. 8 is a flowchart showing an example of the operation of the working machine, the system, the learning device, and the cloud server according to the modified example of the embodiment.

FIG. 8 is a flowchart showing an example of operations of the working machine, the system, the learning device, and the cloud server CS according to the modified example of the embodiment. Referring to FIG. 8, an operation will be described in which after image information of one or a plurality of images IM1 of the working area acquired at the initial stage of construction is associated with positional information at the time of image capturing and information indicating the attitude of the working machine 100a at the time of image capturing and is stored in the working area image information table of the storage unit 150, the working machine 100a determines whether to relearn the learning model, and when it is determined to update, the learning device 300 relearns the learning model and sets the learning model in the system 200.

(Step S1-3)

The working machine 100a travels along the route of the working area.

(Step S2-3)

In the working machine 100a, the image capturing unit 105 acquires image information of one or a plurality of images IM2 of the working area by capturing the image of the surroundings of the working machine 100a.

(Step S3-3)

In the working machine 100a, the collection unit 114 acquires the positional information of the working machine 100a from the position estimation unit 112 when the image capturing unit 105 captures the image of the surroundings of the working machine 100a. The collection unit 114 acquires information indicating the attitude of the working machine 100a when the image capturing unit 105 captures the image of the surroundings of the working machine 100a. The collection unit 114 stores image information of one or a plurality of images IM2 of the working area acquired by capturing the image of the surroundings of working machine 100a, in the working area image information table of the storage unit 150, in association with the positional information at the time of image capturing and the information indicating the attitude of the working machine 100a at the time of image capturing.

(Step S4-3)

In the working machine 100a, the relearning determination unit 116 divides the plurality of object regions included in each of one or a plurality of images IM1 of the working area acquired at the initial stage of construction and one or a plurality of images IM2 of the working area acquired after the progress of construction. The relearning determination unit 116 acquires one or a plurality of images SS1 by dividing a plurality of object regions included in one or a plurality of images IM1 of the working area and acquires one or a plurality of images SS2 by dividing a plurality of object regions included in one or a plurality of images IM2 of the working area. The relearning determination unit 116 determines whether to relearn the learning model on the basis of the acquired one or a plurality of images SS1 and one or a plurality of images SS2. If it is determined not to relearn the learning model, the process returns to step S1-3.

(Step S5-3)

In the working machine 100a, the image processing unit 106 acquires image information of one or a plurality of images IM2 when it is determined to relearn the learning model by the relearning determination unit 116. The image processing unit 106 converts the acquired image information of one or a plurality of images IM2 into image information of a grayscale image.

(Step S6-3)

In the working machine 100a, the creation unit 108 creates one or a plurality of pieces of learning data in which image information of one or a plurality of images IM2 is associated with image information of a grayscale image obtained by converting the image information of one or a plurality of images IM2 from the image processing unit 106.

(Step S7-3)

In the working machine 100a, the creation unit 108 transmits one or more created learning data from the communication unit 102 to the cloud server CS.

Since steps S6-1 to S11-1 of FIG. 3 can be applied to steps S8-3 to S13-3, description thereof will not be provided.

In the modified example of the above-described embodiment, as an example, although a case has been described in which it is determined whether to relearn the learning model on the basis of one or a plurality of images IM1 of the working area acquired at the initial stage of construction and one or a plurality of images IM2 of the working area acquired after the progress of construction, the embodiment is not limited to this example. For example, whether to relearn the learning model may be determined on the basis of images acquired at each of a plurality of time points, without being limited to the initial stage of construction.

According to a control system 500a according to the modified example of the embodiment, in a control system 500, the working machine 100a includes a relearning determination unit 116 which determines whether to relearn the learning model on the basis of a plurality of object regions included in the color images acquired at a plurality of time points.

With this configuration, the working machine 100a divides a plurality of object regions included in the color images acquired at each of a plurality of time points and can determine whether to relearn the learning model on the basis of the plurality of object regions. Therefore, by relearning the learning model, the accuracy of restoring the color image from the grayscale image can be improved.

Further, in the control system 500a, the relearning determination unit 116 acquires a difference portion from a difference image between images obtained by dividing a plurality of objects included in the color images acquired at a plurality of time points for each object and determines whether to relearn the learning model on the basis of the acquired number of pixels in the difference portion.

With this configuration, the working machine 100a can obtain a difference image between images obtained by dividing a plurality of objects included in the color images acquired at a plurality of time points for each object. Here, for example, the difference image is obtained on the basis of images captured at the same position and the same attitude. Since the working machine 100a can acquire the difference portion from the obtained difference image, it is possible to determine whether to relearn the learning model on the basis of the number of pixels of the acquired difference portion.

In addition, in the control system 500a, the relearning determination unit 116 determines to relearn the learning model when the number of pixels in the difference portion is equal to or greater than the threshold value.

With this configuration, since the working machine 100a can determine to relearn the learning model when the number of pixels in the difference portion is equal to or greater than the threshold value, it is possible to improve the accuracy of restoring the color image from the grayscale image by relearning the learning model.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES 100, 100a Working machine
102 Communication unit
103 Sensor
104 Determination unit
105 Image capturing unit
106 Image processing unit
108 Creation unit
110 Control unit
112 Position estimation unit
114 Collection unit
116 Relearning determination unit
140 Drive device
150 Storage unit
200 System
202 Communication unit
206 Processing unit
207 Operation unit
212 Display unit
250 Storage unit
300 Learning device
302 Communication unit
306 Processing unit
308 Creation unit
350 Storage unit
250 Storage unit
500 Control system

What is claimed is:

1. A control system of a working machine,
which control system operates the working machine based on a working image from the working machine,
wherein the working machine comprises:
an image processing unit that converts a color image into a grayscale image; and
a communication unit that transmits the grayscale image from the working machine to the control system as the working image,
wherein the working image comprises an image of surroundings of the working machine, and
the control system comprising:
a system communication unit that receives the working image transmitted by the working machine; and
a processing unit that generates a restored color image from the working image, by use of a learning model that is based on an area image of a working area and a modified image in which tonal information is reduced from the area image,
wherein the learning model employs data based on the area image of the working area and on the modified image to restore the working image to the restored color image.

2. The control system according to claim 1,
wherein the image processing unit creates the working image by lowering a resolution of the grayscale image.

3. The control system according to claim 1,
wherein the working machine further comprises:
a relearning determination unit that determines whether to relearn the learning model on the basis of a plurality of object regions included in the color image acquired at a plurality of time points.

4. The control system according to claim 3,
wherein the relearning determination unit acquires a difference portion from a difference image between images obtained by dividing the plurality of objects included in the color image acquired at a plurality of time points for each object and determines whether to relearn the learning model further on the basis of the number of pixels of the acquired difference portion.

5. The control system according to claim 4,
wherein the relearning determination unit determines to relearn the learning model when the number of pixels of the difference portion is equal to or greater than a threshold value.

6. A control method of a working machine, which control method operates the working machine using a working image captured by the working machine,
wherein the working machine converts a color image into a grayscale image, and
wherein the working machine transmits the grayscale image from the working machine side to a control system side as the working image,
wherein the working image comprises an image of surroundings of the working machine, and
the control method comprising:
receiving, by the control system, the working image transmitted by the working machine; and
generating, by the control system, a restored color image from the working image, by use of a learning model that is based on an area image of a working area and a modified image in which tonal information is reduced from the area image,
wherein the learning model employs data based on the area image of the working area and on the modified image to restore the working image to the restored color image.

* * * * *